US008750111B2

(12) United States Patent
Martinotti et al.

(10) Patent No.: US 8,750,111 B2
(45) Date of Patent: Jun. 10, 2014

(54) METHOD AND DEVICE FOR TRANSMITTING PACKETS IN A TELECOMMUNICATIONS NETWORK

(75) Inventors: Riccardo Martinotti, Savona (IT); Raoul Fiorone, Genoa (IT); Andrea Corti, Varazze (IT)

(73) Assignee: Ericsson AB, Stockholm (SE)

( * ) Notice: Subject to any disclaimer, the term of this patent is extended or adjusted under 35 U.S.C. 154(b) by 1599 days.

(21) Appl. No.: 12/094,924

(22) PCT Filed: Nov. 23, 2006

(86) PCT No.: PCT/EP2006/068808
§ 371 (c)(1),
(2), (4) Date: Jun. 5, 2008

(87) PCT Pub. No.: WO2007/060194
PCT Pub. Date: May 31, 2007

(65) Prior Publication Data
US 2008/0291882 A1    Nov. 27, 2008

(30) Foreign Application Priority Data
Nov. 23, 2005  (IT) .............................. MI2005A2236

(51) Int. Cl.
*H04L 12/26*        (2006.01)
(52) U.S. Cl.
USPC ............................ 370/231; 370/235; 709/232
(58) Field of Classification Search
None
See application file for complete search history.

(56) References Cited

U.S. PATENT DOCUMENTS

| | | | | |
|---|---|---|---|---|
| 6,961,307 B1* | 11/2005 | Aweya et al. | ................. | 370/230 |
| 2003/0012197 A1* | 1/2003 | Yazaki et al. | ................. | 370/392 |
| 2004/0228278 A1* | 11/2004 | Bruckman et al. | ............ | 370/231 |
| 2006/0083186 A1* | 4/2006 | Handforth et al. | ............ | 370/310 |

OTHER PUBLICATIONS

Hui, Guo et al. "A Design and Evaluation of Ethernet Links Bundling Systems." 18th International Conference on Advanced Information Networking and Applications, 2004. Japan, Mar. 29-31, 2004. XP010695247, ISBN: 0-7695-2051-0.
Jeong, S.-H. et al. "QoS Support for UDP/TCP Based Networks." Computer Communications, Elsevier Schience Publishers BD, Amsterdam, NL, vol. 24, No. 1, Jan. 1, 2001, pp. 64-77.

* cited by examiner

*Primary Examiner* — Khoa Huynh
(74) *Attorney, Agent, or Firm* — Coats & Bennett, P.L.L.C.

(57) ABSTRACT

A method and a transport scheme for packets of traffic over a logical link made up of the aggregation of several physical links (16) connecting a transmitting side to a receiving side in which flows of incoming packets are sent to a scheduler/shaper (12) which selects therefrom packets for creating a global flow of packets falling within the bandwidth offered by the logical link on the basis of the bandwidth capability offered by the logical link. A distributor (13) distributes the global flow over the plurality of physical links (16) making up the logical link, oversees the physical links and sends to the scheduler/shaper signalling of a bandwidth decrease caused by failures of one or more physical links. The scheduler/shaper (12) is arranged to allow automatically for the logical link bandwidth variations while selecting the packets from the various incoming queues depending on the associated service class so as to cause the global flow to fall within the aggregated logical link bandwidth. This involves more queuing of packets and their possible drop according to the queue management criteria implemented, in the queues associated with the lowest service class.

7 Claims, 2 Drawing Sheets

METHOD AND DEVICE FOR TRANSMITTING PACKETS IN A TELECOMMUNICATIONS NETWORK

Figure 1:
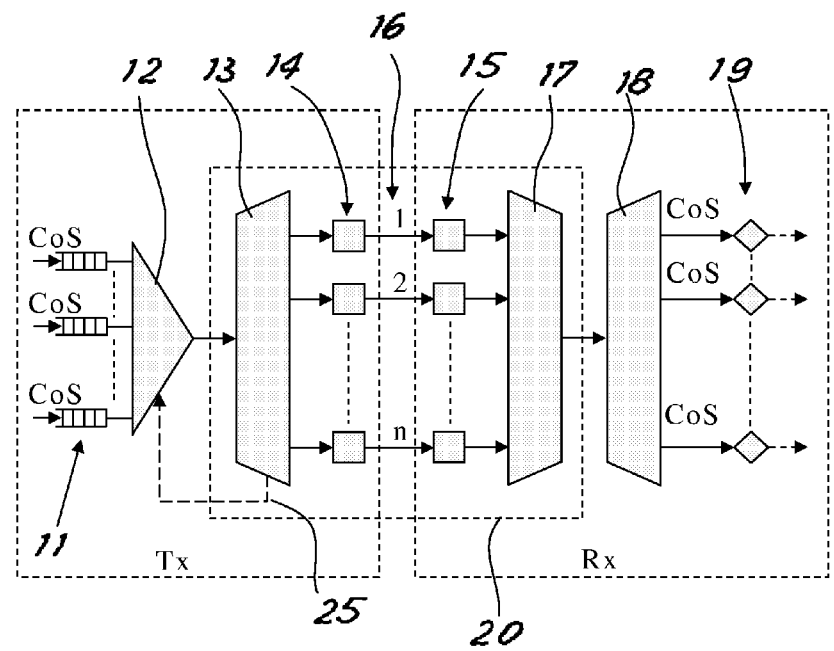

This invention relates to a method and a network link for transport of packets over aggregated links.

Traffic transport over logically aggregated links is a reality. Standard IEEE802.3-2002 defines a functionality called Link Aggregation (LA) where a logically aggregated link is made up of a number of physical links (over Ethernet for example). This functionality can be used for a number of reasons, the most important of which are simplified operation from the upper-levels viewpoint, logical bandwidth increase and a greater traffic protection capability.

The IEEE 802.3-2002 standards describe link aggregation without any awareness of the services actually being transported over the various physical ports making up the aggregated link. This is a considerable limitation for the system. For example, in case of failures involving the failure of one or more physical links making up an aggregated link, the system resizes the aggregated link bandwidth without any awareness of the services transported. Any part of the traffic in excess of the reduced bandwidth is dropped without giving any regard to the Class of Service (CoS) of the packets to be dropped. From the viewpoint of a client who stipulated a Service Level Agreement (SLA), this is obviously unacceptable.

The general purpose of this invention is to remedy the above-mentioned shortcomings by making available methods and schemes with mechanisms allowing for specific requirements of the services transported over the logically aggregated link.

In view of this purpose it was sought to provide in accordance with this invention a method for sending traffic packets over a logical link made up of the aggregation of several physical links in which flows of incoming packets are sent to a scheduler/shaper which selects therefrom packets to create a global flow of packets falling within the bandwidth offered by the logical link on the basis of the bandwidth capability offered by the logical link and in which the packets in the incoming flows are classified according to service classes and in which, upon a decrease in the bandwidth offered by the logical link the scheduler/shaper acts on the incoming packets in such a manner that some of the incoming packets are queued or dropped to cause the global flow to fall within the bandwidth of the aggregated logical link depending on information correlated with the associated class of service of the packets.

Again in view of said purpose, it was sought to realize in accordance with this invention a scheme for traffic packet transport over a logical link made up of the aggregation of several physical links connecting a transmitting side to a receiving side and in which flows of incoming packets are sent to a scheduler/shaper which selects therefrom packets for creating a global flow of packets falling within the bandwidth offered by the logical link on the basis of the bandwidth capability offered by the logical link to then send them over the logical link to the receiving side and characterized in that it comprises a distributor which distributes the global flow over the plurality of physical links forming the logical link and oversees the physical links and sends to the scheduler/shaper signalling of the bandwidth decrease caused by failures of one or more physical links and which the scheduler/shaper is arranged to select the packets of the various queues so that they are queued or dropped depending on information correlated with the associated service class to cause the global flow to fall within the aggregated logical link bandwidth.

Figure 2:
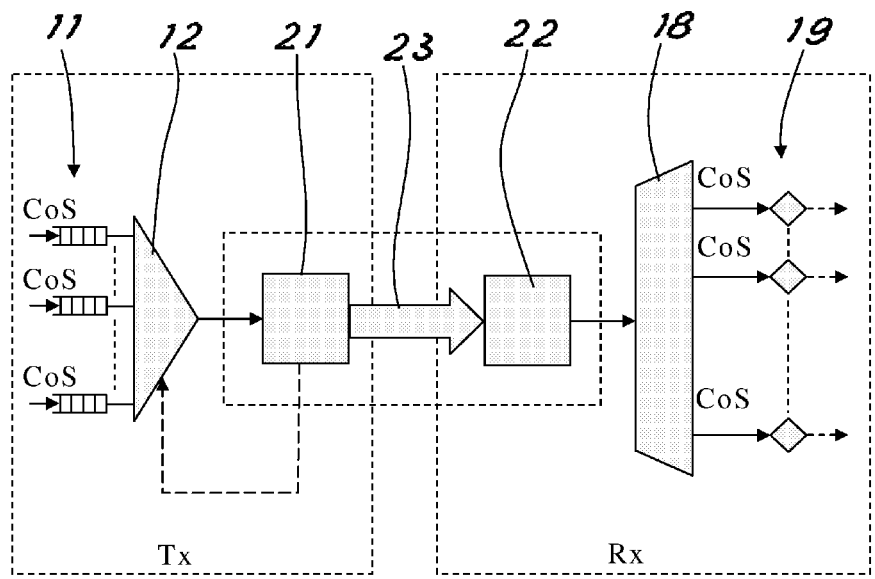
Figure 3:
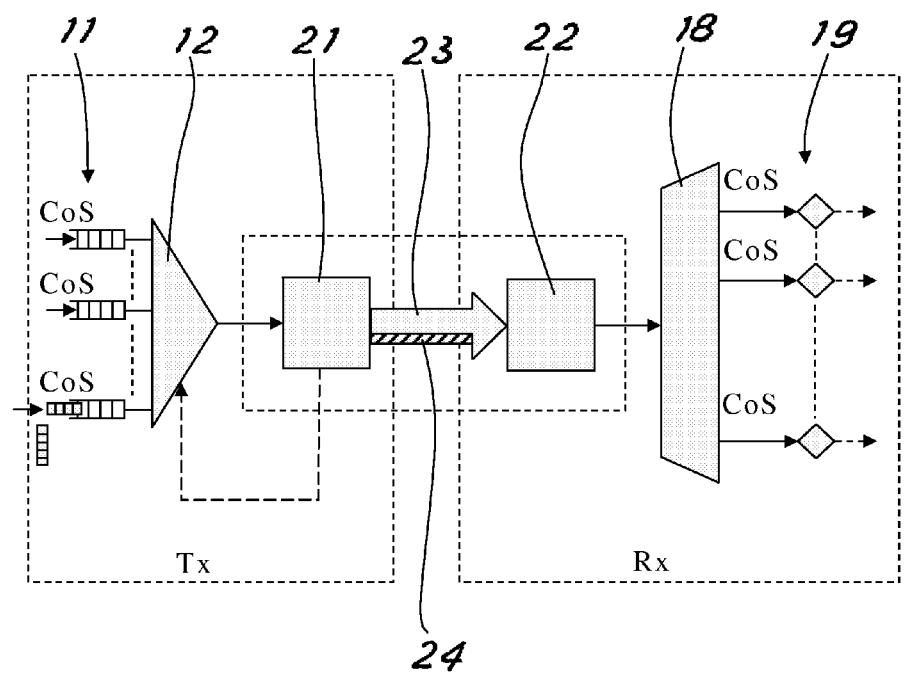

To clarify the explanation of the innovative principles of this invention and its advantages compared with the prior art there is described below with the aid of the annexed drawings a possible embodiment thereof by way of non-limiting example applying said principles. In the drawings:

FIG. 1 shows a functional scheme of a service-aware aggregated link transport realized in accordance with this invention, FIG. 2 shows the equivalent logical scheme of the functional scheme of FIG. 1, and FIG. 3 shows a scheme similar to that of FIG. 2 in case of failure of one or more aggregated links.

With reference to the figures, FIG. 1 shows a functional scheme of a system of a connection with aggregated links realized in accordance with the principles of this invention.

As may be seen in FIG. 1, m flows of packets to be transported are queued in queues 11 with each flow having its own associated Class of Service (CoS). It is noted that the number of queues can be arbitrary but that, as is known, the capability of using at least one queue per class of service allows optimising the performance of the entire system if it is aware of the transported services. The traffic queue to which a flow of data belongs determines how the packets of that flow will be treated in the network nodes.

The queued flows are selected by a scheduler/shaper 12 which gives each of the packets a transmission priority dependant on the associated class of service, with the result of delaying transmission where necessary of those of the lowest service classes (various possible queue management policies will be implemented to drop the packets appropriately). The global flow at the outlet of the scheduler/shaper 12 is sent to a distributor 13 which divides the total flow into n flows each applied to one of n physical links 16 between a transmission interface 14 and a reception interface 15.

The n flows that reach the receiving side are applied by the receiving interfaces 15 to a merger 17 to again obtain the global flow that is then applied to a classifier 18 that again divides the packets into flows according to the m starting service classes. The flows can then possibly be treated by a policer 19 in cases where it is appropriate.

It is clear that, at the ends of the global flows exchanged between scheduler/shaper 12 and classifier 18, the block 20 realizes transparently a logical link formed by aggregation of the n physical links and that it has the total bandwidth sum of the bandwidths of the n physical links. The aggregate link is seen and treated as a single logical entity by the higher layers as though it were single physical link. It is also noted that the bandwidth actually usable for traffic whose transmission must be guaranteed cannot exceed (n−k) times the capability of the individual physical link, where k is the number of physical links whose simultaneous failure must not create any inefficiency for design objectives. It is also noted that typically in real cases k=1.

This is diagrammatically shown in FIG. 2 where the logical scheme shows the block 20 as made up of a single logical transmission interface 21 and a single logical reception interface 22 connected by the aggregate link 23.

The distributor (which has information on the presence, operation and capability of the physical links connected thereto and usable for realization of the logical link) communicates with the scheduler/shaper 12 to pass thereto the information 25 on the real capability of the logical link.

In accordance with this invention the scheduler/shaper is responsible for the flow treatment policy based on the class of service and on the characteristics of the logical link. In this manner the scheduler/shaper 12 can select the packets to be transmitted whilst being aware of the available bandwidth by choosing them appropriately from the various incoming queues. This has the result of delaying transmission of those with lower priority (that is, belonging to the lower service classes); these packets can even be eliminated from the network depending on the queue management policy implemented and also in consideration of the quality of the service to which the traffic must be subjected. In this manner, the communication of the occurrence of a total bandwidth decrease of the logical link due, for example, to failure of one or more physical links is translated into optimisation of the operation procedure of the scheduler/shaper in such a manner as to always allow transmission of the traffic with highest priority (i.e. belonging to the highest service class) at the expense of the lower priority traffic.

Thanks to the principles of this invention the unit 23 made up of n aggregated links is placed within a service-aware framework providing what the aggregated link unit is not able to do, without requiring any modification of the aggregated link mechanisms.

With reference to the existing implementation of the aggregated link, the functionality and its protocols are not changed by the service-aware framework which provides its functionality in addition to the mechanisms provided by the aggregated link (that is to say, for example, in the distribution criteria), ensuring this way interoperability.

The awareness of the services can be perceived as a useful characteristic to have for the purpose of handling the various traffic types but may not seem to be essential for the specific application during normal operation of the network. In case of failure of the aggregated link, awareness of the services becomes fundamental for putting the network operator in a position to guarantee a Service Level Agreement (SLA) binding it to respect of the performance that the clients expect for the corresponding payment.

FIG. 3 shows a fault scenario, to with, a physical link within a group of aggregated links has failed. The communication capability of the logical link 23 is therefore reduced by the bandwidth (represented diagrammatically by reference number 24 in FIG. 3) by the bandwidth of the failed physical link.

It is here that awareness of the service is shown to be advantageous. Indeed, in a prior art system (that is, no service awareness) complying with standard IEEE 802.3-2002, the group of aggregated links rearranges the traffic on the n−1 physical links available with no awareness of the type or Class of Service (CoS) of the packets that might have to be dropped after the failure. If the bandwidth required by the total traffic over the aggregated link is greater than that provided by the remaining n−1 physical links, the excess packets will be dropped without a real criterion. This involves a maximum drop in bandwidth equal to the bandwidth of the physical link that failed. In case of multiple failures, the situation will be understandably more serious.

It is noted that with the prior art the problem is not the need for having to drop any excess packets but not having a criterion for doing it that allows for the service class to which the packets belong and which works so as to respect the SLA toward the final client.

Thanks to the principles of this invention, the scheduler/shaper works on the basis of the CoS of the various packets flows so that those with the lowest service class can be dropped while saving those with higher service class. Other information correlated with the service classes and which the scheduler/shaper can consider, even in combination, can be associated with the packets for deciding the queuing/dropping of the packets in the queues. For example, where the packets in each service class have different drop precedence the queue management policy can concern itself with dropping the packets with highest drop precedence first.

It is now clear that the preset purposes have been achieved.

In accordance with this invention it is possible to set the aggregated links with service awareness. This invention can be used with the presently standardized aggregated link with other possible implementations of an aggregated link or can be integrated to make up a single entity. This invention gives network operators the choice of having the advantage of aggregated links with the possibility of signing more profitable SLAs, thanks to the capability of differentiating the services in the aggregated links either during normal operation or in case of failures.

This invention does not require alternations to current link aggregation methods or more generally, of a generic aggregated link, which would be architecturally in accordance with the schemes provided.

This invention can also be incorporated in a new implementation of an aggregated link or can remain wrapped around it, as in the case of the currently standard aggregated link.

The essential advantages of this invention lie in the capability of providing protection mechanisms aware of the service over an aggregated link made up generally of n physical ports. This allows ensuring Quality of Service (QoS) performance in accordance with a Service Level Specification (SLS) accompanying a Service Level Agreement even in case of failures.

Naturally the above description of an embodiment applying the innovative principles of this invention is given by way of non-limiting example of said principles within the scope of the exclusive right claimed here.

The invention claimed is:

1. A method, performed at a network device, for transmitting traffic packets over a logical communications link comprising an aggregation of a plurality of physical communication links, the method comprising:
   at a scheduler/shaper of the network device:
      receiving incoming packets, each of which is classified according to a class of service;
      selecting, on the basis of a bandwidth capability of the logical link, incoming packets to generate a global flow of traffic packets to be transmitted over the logical link; and
      in the event of a reduction in the bandwidth capability of the logical link signaled by a distributor of the network device, selectively queuing or dropping one or more incoming packets based on information associated with the corresponding class of service, so as to cause the global flow to fall within the reduced logical link bandwidth capability.

2. The method of claim 1 wherein the packets in each class of service have an associated drop precedence.

3. The method of claim 1 wherein the logical communication link is formed according to link aggregation functions specified in standard IEEE 802.3-2002.

4. A network device for transporting packet traffic over a logical communication link, the network device comprising:
   a logical link comprising a plurality of aggregated physical communication links;
   a transmitter comprising:
      a scheduler/shaper configured to:
         receive flows of incoming packets; and
         select packets from the incoming flows to generate a first global flow of packets falling within a bandwidth capability of the logical link;

a distributor interposed between the scheduler/shaper and the logical link and configured to:
  distribute the first global flow of packets over the plurality of aggregated physical communication links that form the logical link;
  control the physical communications links; and
  signal to the scheduler/shaper any decrease in bandwidth capability of the logical link device; and
wherein the scheduler/shaper is further configured to selectively queue or drop packets in response to a decreased logical link bandwidth capability signal from the distributor and information correlated with a service class associated with the packets, so as to cause the first global flow to fall within the logical link bandwidth capability.

5. The network device of claim 4 wherein the information correlated with a service class associated with the packets includes a drop precedence.

6. The network device of claim 4 further comprising:
a receiver comprising:
  a merger connected to the logical link and configured to:
    receive packets distributed over the plurality of physical links, and
    merge the received packets to generate a second global flow; and
  a classifier connected to the merger and configured to:
    receive the second global flow of packets;
    determine a class of service classification for each packet in the second global flow; and
    generate one or more output flows of packets based on the determined class of service classification for each packet.

7. A network device for transporting packet traffic over a logical communication link, the network device comprising:
a logical link comprising a plurality of aggregated physical communication links;
a transmitter comprising:
  a scheduler/shaper configured to:
    receive flows of incoming packets, each having an associated class of service; and
    select packets from the incoming flows, based on the class of service, to generate a global flow of packets falling within a current bandwidth capability of the logical link; and
  a distributor interposed between the scheduler/shaper and the logical link and configured to:
    distribute the first global flow of packets over the plurality of aggregated physical communication links that form the logical link;
    control the physical communications links; and
    communicate a current bandwidth capability of the logical link to the scheduler/shaper.

* * * * *